April 4, 1967      J. D. WALKER      3,312,346
SEWAGE TREATMENT PLANTS WITH MOVABLE PARTITION
Filed Dec. 29, 1964      2 Sheets-Sheet 1
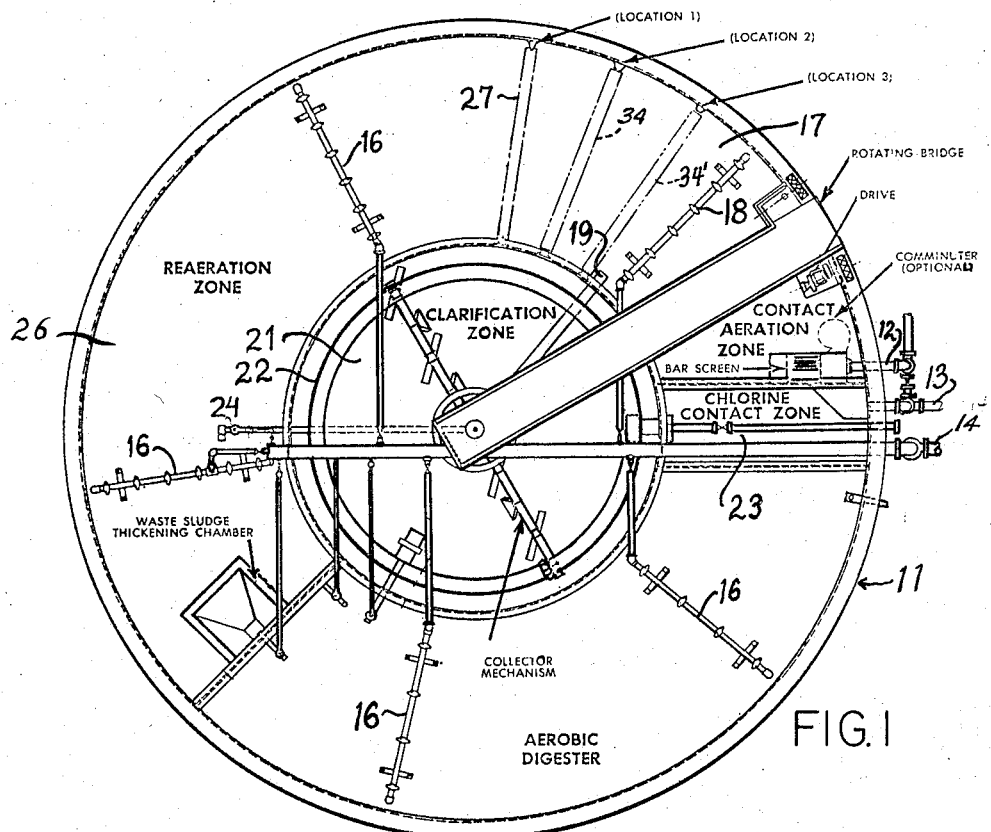
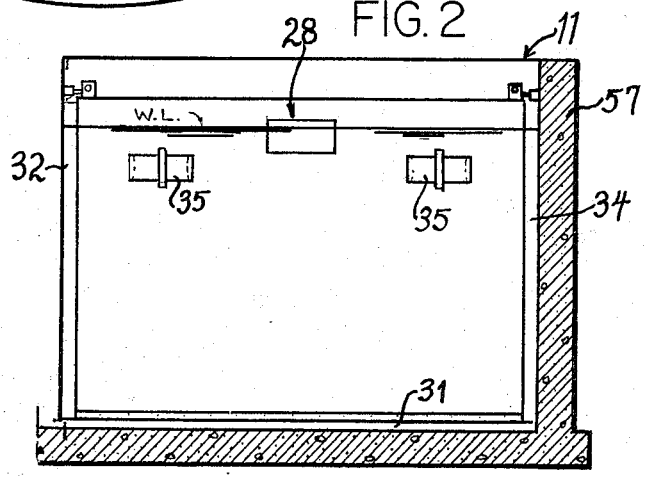
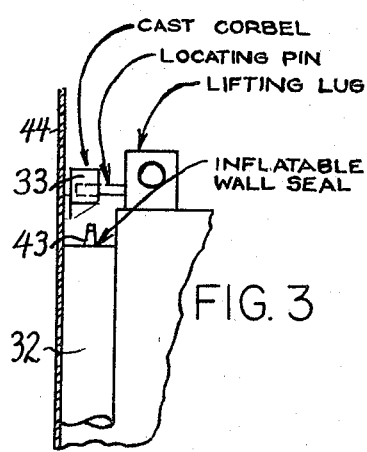
INVENTOR.
JAMES DONALD WALKER
BY
Darbo, Robertson & Vandenburgh

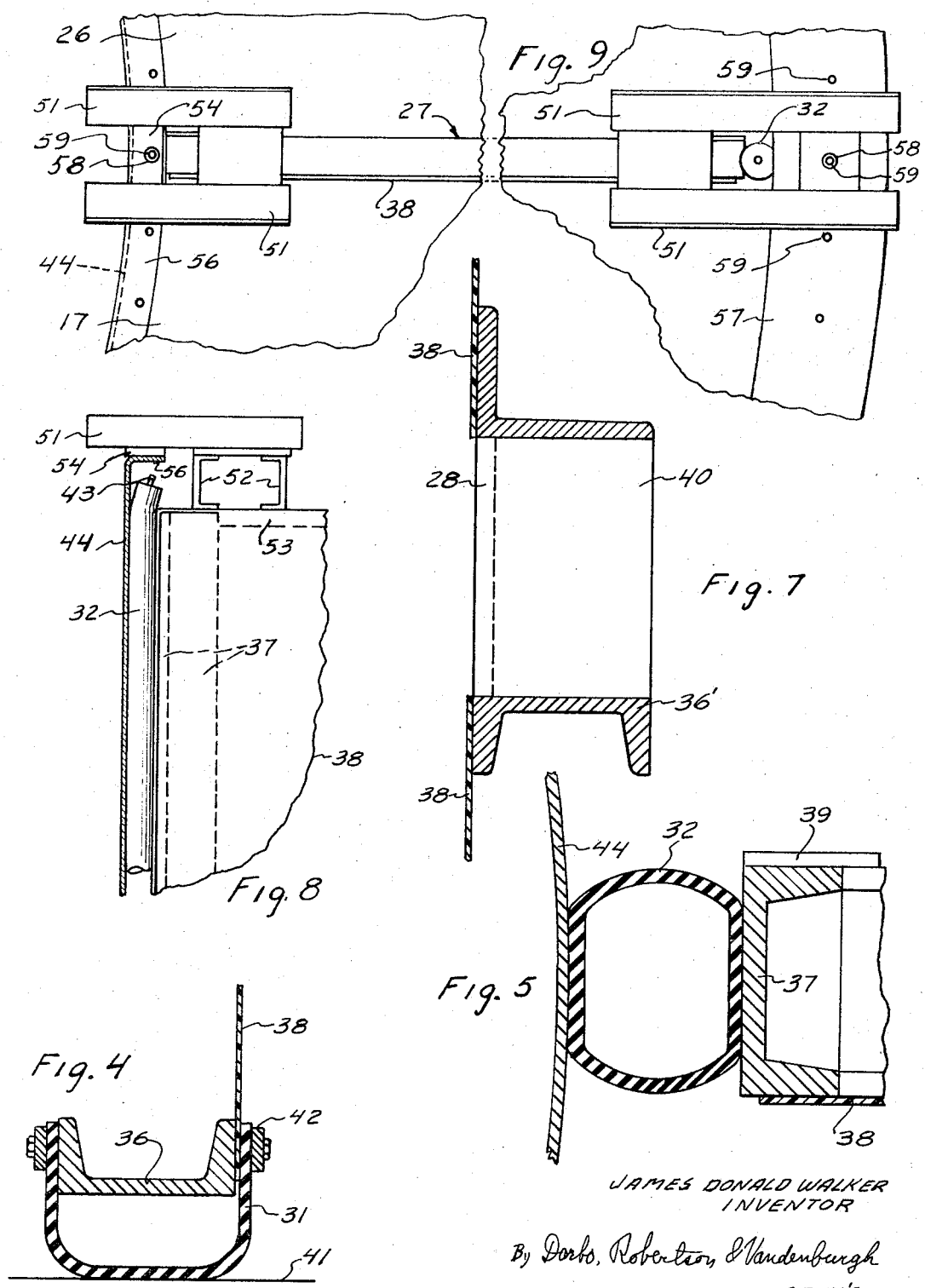

United States Patent Office 3,312,346
Patented Apr. 4, 1967

3,312,346
SEWAGE TREATMENT PLANTS WITH MOVABLE PARTITION
James Donald Walker, Aurora, Ill., assignor, by mesne assignments, to Chicago Bridge & Iron Company, Chicago, Ill., a corporation of Illinois
Filed Dec. 29, 1964, Ser. No. 421,912
8 Claims. (Cl. 210—195)

The invention of which the present disclosure is offered for public dissemination in the event a patent is granted relates to any sewage treatment plants in which the aeration of a stabilization step can be held within acceptable critical limits by moving a partition wall to adjust the size of the chamber of the tank in which the step is performed.

The invention is especially useful in relatively small unitary treatment plants, sometimes called a "package" plant. In such a plant, one large tank (50 ft. in diameter, for example) is divided by inner partitions into several chambers, each having a different function. A preferred general method of treatment is that known as "contact stabilization," which is a variation of the famous activated sludge treatment process. The main activated sludge aeration treatment occurs in one chamber. Sludge which has been treated in that chamber flows through a partition wall to a contact stabilization chamber or contact aeration chamber, to which the raw sludge is also fed. After a relatively brief aeration in this chamber, the mixed liquids flow into the clarification chamber where the solids settle and a clear effluent flows off. This contact stabilization step is very desirable, especially in small treatment plants which are expected to operate with very little supervision, and that supervision often relatively unskilled. However, it is very important that this contact stabilization shall not be continued too long, or it will produce a type of sludge which is difficult to settle, and which, therefore, might cause sludge to be carried off in the effluent. This would, of course, amount to very unsatisfactory treatment.

The volume of flow which passes through the plant is, of course, beyond control, being of whatever volume of sewage comes to the plant. In a contact stabilization chamber of a given volumetric capacity, therefore, the detention time, or treatment time within the chamber, tends to be determined by the volume of flow to the plant. Although some adjustment can be made by variations in the amount of recirculation of the activated sludge, the amount of adjustment which can be made in this manner without causing other difficulties to occur is limited. It should, therefore, be possible to vary the size of the contact stabilization chamber in order to keep its detention time within the critical limits, between too little detention time to do the job or too long a detention time with resultant poor settling of sludge.

According to the present invention, the size of the contact stabilization chamber is very easily adjusted by moving a partition wall which separates it from the main activated sludge treatment section. Although this wall has a port through it for flow between the chambers, the port is sized for a predetermined rate of flow, and, accordingly, it is desired that the wall, except for this sized-designed port, be substantially sealed. This is accomplished according to the present invention by a hollow rubber seal. The seal along the bottom may be a conventional type of flexible seal, inasmuch as the partition may be positioned at a predetermined height to make this flexible seal reliable. However, it is not practicable to use this type of seal along the sides of the partition partly because proper sealing pressure would make movement of the wall difficult. Accordingly, the side seals are inflatable, according to the present invention. Although the inflating medium could be liquid under greater pressure than the hydrostatic pressure, air is preferably used because of the ease with which it can be used and because of the ease in which the pressure can be released or reduced in order to permit easy movement of the wall to reduce or enlarge the size of the contact stabilization chamber.

Movement of the wall is further aided in any except the very smallest sizes, by attaching to the wall buoyancy tanks which, when the wall is in its normal position of being nearly submerged, provides a buoyancy just a few pounds, perhaps thirty pounds, below the weight of the wall. This makes it quite easy for one man to raise the wall enough to take the pressure off of the bottom seal so that, assuming the side seals have been depressurized, the wall may be moved.

Additional objects and advantages of the invention will be apparent from the following description.

DESIGNATION OF FIGURES

FIGURE 1 is a plan view of a unitary treatment plant chosen for illustration of the present invention;

FIGURE 2 is a vertical radial sectional view through a portion of FIG. 1, showing a face view of the movable wall;

FIGURE 3 is a view on a larger scale of the upper left-hand corner of FIG. 2;

FIGURE 4 is a fragmentary vertical section of the view showing especially the bottom seal and bottom frame member of the wall;

FIGURE 5 is a similar view but in horizontal cross section to show especially the cross section of a vertical frame member of the wall, a side seal secured thereto, and a cylindrical fixed wall against which the side seal bears;

FIGURE 6 is a detailed view of a supporting corbel seen in FIG. 3;

FIGURE 7 is a fragmentary sectional view showing the port through the movable wall;

FIGURE 8 is a fragmentary view similar to FIG. 3 but showing a modified form of wall support; and FIGURE 9 is a fragmentary plan view of the wall support of FIG. 8.

GENERAL DESCRIPTION

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirements of pointing out the parts, improvements, or combinations in which the inventive concepts are found.

The invention has been illustrated in connection with a unitary sewage treatment plant, all within one tank 11. A concrete tank has been illustrated but it can be of steel. Sewage to be treated flows into the tank at 12 and the effluent, which should be crystal clear, flows out at 13. Compressed air flows in at 14 for supplying air to aeration headers 16 and to air-lift pumps. The tank 11 is provided with partitions which form various treatment chambers or zones. The chamber to which the raw sewage flows first is the contact aeration chamber, or contact stabilization zone 17. In this chamber the sewage is mixed with activated sludge which results from the process, and is aerated, both the mixing and aeration being accomplished by liberation of air deep in the tank through spargers 18. The mixed liquor enters a pipe 19 carrying it to clarification chamber 21. In the clarification chamber the solids settle to the bottom and a clear plant effluent flows over the edges of a collector trough 22, from which it flows into a chlorine contact zone 23, from which it flows out of the plant as a harmless effluent through the pipe 13. The solids which settled downwardly form a sludge in the bottom of the clarification zone which is drawn out by an air-lift pump 24, into the re-aeration zone 26 which may be considered the main activated sludge treatment section.

The contact aeration zone 17 is separated from the re-aeration zone 26 by a movable wall 27, according to this invention. As seen in FIG. 2, this wall has a port 28 through which the desired amount of activated sludge from chamber 26 flows into the contact aeration zone.

It is important that the length of detention time in the contact aeration zone 17 be between rather critical limits. If it is insufficient, the raw sewage entering is not sufficiently stabilized, and some portions of it will fail to settle in the clarification zone. If the mixed raw and activated sludge is aerated too long, it develops a form of sludge which has a tendency to "bulk," or to form a large floating mass of sludge in the clarification zone, so that great quantities of the solids flow into the collector trough 22 and out in the effluent.

The detention time in tank 17 depends on the volumetric size of the chamber and on the rate of flow through it. The rate of inflow of raw sewage is, of course, beyond control. The rate of return of activated sludge can be varied only within rather narrow limits without causing difficulties elsewhere. According to the present invention, the proper detention time in contact aeration zone 17 is therefore accomplished by making the wall 27 in the form of a very readily movable and nevertheless adequately sealed wall.

As seen in FIG. 2, the wall 27 is provided with a bottom seal 31 of flexible nature, and side seal 32 of flexible inflatable nature. The wall is hung at the desired position on corbels 33. It is provided with buoyancy tanks 35 attached to it so that after deflation of the inflatable seals 32, it can readily be raised and moved to another position, such as either of the positions shown in FIG. 1 in broken lines at 34 and 34'. At the time of manufacture, several sets of corbels may be provided, but the operator can easily attach another set if he desires to try a location where there are no corbels. Enlarging the re-aeration chamber 26, as wall 27 is moved, can never be harmful. Reducing the size of re-aeration chamber 26 is harmless within the ranges contemplated because it merely slightly reduces a generous margin of safety for which chamber 26 is designed.

Details of movable wall

As seen in FIGS. 4 and 5, the wall 27 includes a framework including, for example, a horizontal bottom channel 36 and vertical channels 37 which may be braced by gussets 39. One or more panels 38 may be attached to the frame members 36 and 37 to form the wall face. These panels are preferably of the material known as fiber glass panels, a mixture of fiber glass and resin. Of course, they are impervious, and not subject to attack by the sewage. Except perhaps in the very smallest treatment plants, there will not only be a frame of channel members 36 and 37, but also a structural grid, not shown, within the frame. In that event, it is most convenient to provide a number of separate panels 38, each forming the skin of one section of wall surrounded by the grid to which the panel is secured. It is also desired to frame the port 28 by suitable metal members. Conveniently, the frame on one side might be a horizontal grid member 36' and the remainder a U shaped cast frame 40.

As seen in FIG. 4, the bottom seal 31 may conveniently be merely a heavy strip of neoprene rubber secured along both edges to the bottom horizontal frame 36. It may be open at its ends, relying on the resiliency of the rubber to maintain the seal against the bottom surface 41. The edges of strip 31 may be secured by metal strips 42, which may be attached to horizontal frame 36 by screws. Along one side, the same securing means may also attach the fiber glass panel 38.

As seen best in FIG. 3, the inflatable side seals 32 are provided with valve inflation stems 43, one at the upper end of each of the inflatable side seals. The preferred cross section of the inflatable seal in use is shown in FIG. 5. The size of the tube of neoprene rubber which forms the side seal is preferably such that the sides of the tube will be considerably flattened, as shown. The seal 32 is secured to a vertical channeled member by being cemented to it. After installation, not before, the seal 32 is inflated through the stem 43 to a pressure sufficient to maintain the seal. This pressure should be a little higher than the hydrostatic pressure at the bottom of the tank. When it is desired to move the wall, it is merely necessary to deflate the seals 32 or reduce their pressure to the extent that the friction of these seals on the adjacent circular wall 44 does not interfere excessively with the movement of the wall 27.

Modified hanger

FIGURE 8 shows a modified form of hanger which does not need corbels and which therefore permits movement of the wall by any desired amount. In this instance, a hanger bar 51 is secured by brackets 52 to top horizontal frame member 53 of wall 27. There is a hanger bar 51 at each end of the top frame member, that is at each edge of the wall, or as seen in FIG. 9 there may be two such hangers 51 at each position, thereby providing greater stability in the location of the wall. A shoe 54 secured to and bridging across the under sides of the bars 51 rests on the supporting flange 56 on circular wall 44, and another such shoe 54 rests on outer wall 57. Shoes 54 may each be provided with a hole 58 for fitting over one of a series of studs 59 projecting up from the wall at various locations where the wall 27 might be desired. These studs may be threaded to receive a hold-down nut, but such nut probably will be found to be not needed.

Sewage plant details

The type of sewage plant illustrated is already well known and need not be described in detail. It is described, for example, in Bulletin 19–S–94 of Walker Process Equipment, Inc., Aurora, Illinois, which is hereby made a part of this disclosure by reference. The specific bulletin thus incorporated bears a notation "Copyright, April 1964."

Further details

The frame members 36, 37 etc. may be of annodized aluminum or redwood. The larger walls may be made in two or more sections assembled in the field. For example, two side-halves of the frame, each having a seal tube 32 cemented to it, may be secured together in the field by bolts passing through the webs of the channel members, preferably with a neoprene gasket between the sections. Slight imperfections in the sealing of wall 27 are harmless unless their total flow is significant compared to the flow through port 28. Even significant flow in leaks could be tolerated by making port 28 correspondingly smaller, if the leakage flow were constant. However, leaks are likely to become clogged and the illustrated seals confine the leaks to such a small total volume that eventual clogging makes no perceptible difference. If possible variations are to be tolerated, the seals may be omitted and some other means operable without dewatering the tank, used for clamping or locking the movable wall in place. Further study may even provide such a wall free from excessive danger or variations in leakage flow. The broad concept of moving the wall (as at the expense of dewatering the tank and bringing in a crane to lift it) is not claimed as part of the present invention.

If a redwood frame is used for the movable wall, weights may be attached near its bottom instead of buoyancy tanks being attached shortly below the waterline. A metal frame is preferred because there is obviously no danger of changing buoyancy due to water-logging of the wood.

What I here claim is:

1. A sewage treatment plant including tank means forming a plurality of chambers including a contact aeration zone, a clarification zone, and an activated sludge re-aeration zone; inflow means leading to the contact aeration zone for supplying raw sewage to the plant, said plant including connecting passage means and pump means for causing flow from the contact areation zone to the clarification zone and from the lower part of the clarification zone to the re-aeration zone, and from the re-aeration zone to the contact aeration zone; one of the partitions of said plant which separates the contact aeration zone from another zone being a movable wall, said wall having a flexible seal at its bottom and having inflatable seals along its sides with valves for deflating the seals to permit movement of the wall, and hanger means for supporting the movable wall at a height suitable for positioning the flexible seal in flexed condition on the tank bottom, said hanger means being unobstructed to facilitate raising the movable wall to relieve the pressure on the bottom seal and to facilitate movement of the wall.

2. A sewage treatment plant including tank means forming a plurality of chambers including a contact aeration zone, a clarification zone, and an activated sludge re-aeration zone; inflow means leading to the contact aeration zone for supplying raw sewage to the plant, said plant including connecting passage means and pump means for causing flow from the contact aeration zone to the clarification zone and from the lower part of the clarification zone to the re-aeration zone, and from the re-aeration zone to the contact aeration zone; one of the partitions of said plant which separates the contact aeration zone from another zone being a movable wall, said wall having a flexible seal at its bottom and having inflatable seals along its sides with valve means accessible when the plant is operating for deflating the seals to permit movement of the wall, and hanger means for supporting the movable wall at a height suitable for positioning the flexible seal in flexed condition on the tank bottom.

3. A sewage treatment plant including tank means forming a plurality of chambers including a contact aeration zone, and an activated sludge re-aeration zone; inflow means leading to the contact aeration zone for supplying raw sewage to the plant, said plant including connecting passage means and pump means for causing flow from the contact aeration zone in a course extending to the re-aeration zone, and from the re-aeration zone to the contact aeration zone; one of the partitions of said plant which separates the contact aeration zone from another zone being a movable wall, said wall having a flexible seal at its bottom and having inflatable seals along its sides with valve means accessible when the plant is operating for deflating the seals to permit movement of the wall, and hanger means for supporting the movable wall at a height suitable for positioning the flexible seal in flexed condition on the tank bottom.

4. A sewage treatment plant including tank means forming a plurality of chambers including a contact aeration zone, and an activated sludge re-aeration zone; inflow means leading to the contact aeration zone for supplying raw sewage to the plant, said plant including connecting passage means and pump means for causing flow from the contact aeration zone in a course extending to the re-aeration zone, and from the re-aeration zone to the contact aeration zone; one of the partitions of said plant which separates the contact aeration zone from another zone being a movable wall, said wall having inflatable seals along its sides with valve means accessible when the plant is operating for deflating the seals to permit movement of the wall, and hanger means for supporting the movable wall.

5. A sewage treatment plant including tank means forming a plurality of chambers including a contact aeration zone, and an activated sludge re-aeration zone; inflow means leading to the contact aeration zone for supplying raw sewage to the plant, said plant including connecting passage means and pump means for causing flow from the contact aeration zone in a course extending to the re-aeration zone, and from the re-aeration zone to the contact aeration zone; one of the partitions of said plant which separates the contact aeration zone from another zone being a movable wall, said wall having inflatable seals along its sides with valve means accessible when the plant is operating for deflating the seals to permit movement of the wall.

6. A sewage treatment plant including tank means forming a plurality of chambers including a contact aeration zone, and an activated sludge re-aeration zone; inflow means leading to the contact aeration zone for supplying raw sewage to the plant, said plant including connecting passage means and pump means for causing flow from the contact aeration zone in a course extending to the re-aeration zone, and from the re-aeration zone to the contact aeration zone; one of the partitions of said plant which separates the contact aeration zone from another zone being a movable wall, said wall having expansion seal means projecting laterally therefrom to clamp the wall in place and readily releasable while the plant is in operation, for moving the wall.

7. A sewage treatment plant including tank means forming a plurality of chambers including a contact aeration zone, and an activated sludge re-aeration zone; inflow means leading to the contact aeration zone for supplying raw sewage to the plant, said plant including connecting passage means and pump means for causing flow from the contact aeration zone in a course extending to the re-aeration zone, and from the re-aeration zone to the contact aeration zone; one of the partitions of said plant which separates the contact aeration zone from another zone being a movable wall, said wall having expansion means projecting laterally to clamp the wall in place and readily releasable while the plant is in operation, for moving the wall.

8. A sewage treatment plant according to claim 7 having water-displacement means for adjusting the weight of the wall, submerged to normal depth, to a weight readily raised manually for movement along the tank and biasing the wall to an upright position.

No references cited.

REUBEN FRIEDMAN, *Primary Examiner.*

J. DECESARE, *Assistant Examiner.*